(12) United States Patent
Altobelli et al.

(10) Patent No.: US 11,607,857 B2
(45) Date of Patent: Mar. 21, 2023

(54) DELIVERY AND COLLECTION VEHICLE WITH BALER

(71) Applicant: Pratt Corrugated Holdings, Inc., Brookhaven, GA (US)

(72) Inventors: Michael Altobelli, New Fairfield, CT (US); Myles Cohen, Atlanta, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 171 days.

(21) Appl. No.: 17/315,018

(22) Filed: May 7, 2021

(65) Prior Publication Data

US 2021/0260845 A1 Aug. 26, 2021

Related U.S. Application Data

(63) Continuation of application No. 15/869,575, filed on Jan. 12, 2018, now Pat. No. 11,034,115.

(51) Int. Cl.
  *B30B 9/30* (2006.01)
  *B60P 3/00* (2006.01)

(52) U.S. Cl.
  CPC ............ *B30B 9/3057* (2013.01); *B30B 9/301* (2013.01); *B30B 9/3042* (2013.01); *B60P 3/00* (2013.01)

(58) Field of Classification Search
  CPC ....... B30B 9/30; B30B 9/3042; B30B 9/3046; B30B 9/3057; B30B 13/00; B65F 2210/162; B65F 9/00; B65F 3/201; B65F 3/14; B65F 3/143; B60P 3/00
  USPC ............................ 100/100; 414/525.2, 525.6
  See application file for complete search history.

(56) References Cited

U.S. PATENT DOCUMENTS

| | | | |
|---|---|---|---|
| 2,605,912 | A | 8/1952 | Small et al. |
| 2,816,502 | A | 12/1957 | Eismann |
| 3,355,044 | A | 11/1967 | Nelson |
| 3,367,287 | A | 2/1968 | Dunlop |
| 3,467,001 | A | 9/1969 | Balbi |
| 3,557,683 | A | 1/1971 | Boyd |
| 3,752,529 | A | 8/1973 | Remke et al. |

(Continued)

FOREIGN PATENT DOCUMENTS

| | | |
|---|---|---|
| AU | 4192293 | 9/1993 |
| CA | 2343552 | 10/2001 |

(Continued)

OTHER PUBLICATIONS

Altobelli, Michael; Notice of Allowance for U.S. Appl. No. 15/869,568, filed Jan. 12, 2018, dated Jun. 3, 2019, 18 pgs.

(Continued)

*Primary Examiner* — Jimmy T Nguyen
(74) *Attorney, Agent, or Firm* — Taylor English Duma LLP

(57) ABSTRACT

An extension for connection to a vehicle can include a first side, a second side, a ceiling, and a bottom, the first side opposing the second side and the ceiling opposing the bottom, each of the first side and second side connected to the ceiling and the bottom; a partition arranged between the first side and the second side; and a baler, wherein the ceiling, the first side, the bottom, and the partition define a storage compartment, wherein the ceiling, the second side, the bottom, and the partition define a baler compartment, and wherein the baler is arranged within the baler compartment, the baler comprising a compression system and a baling system.

20 Claims, 6 Drawing Sheets

(56) References Cited

U.S. PATENT DOCUMENTS

| | | | |
|---|---|---|---|
| 3,929,371 | A | 12/1975 | Gibson |
| 4,242,953 | A | 1/1981 | St-Gelais |
| 4,840,531 | A | 6/1989 | Dinneen |
| 4,915,570 | A | 4/1990 | Rath et al. |
| 5,042,863 | A | 8/1991 | Fraga |
| 5,078,567 | A | 1/1992 | Lombardo |
| 5,116,184 | A | 5/1992 | Pellegrini |
| 5,123,801 | A | 6/1992 | O'Daniel |
| 5,458,452 | A | 10/1995 | Pellegrini |
| 5,484,246 | A | 1/1996 | Horning et al. |
| 5,628,442 | A | 5/1997 | Wayne |
| 5,681,140 | A | 10/1997 | Christenson |
| 5,709,252 | A | 1/1998 | Princiotta et al. |
| 5,823,728 | A | 10/1998 | Zeldman et al. |
| 5,829,842 | A | 11/1998 | Lombardo |
| 5,842,652 | A * | 12/1998 | Warsing .................. B65F 3/001 241/101.76 |
| 5,988,972 | A | 11/1999 | Boivin |
| 6,027,300 | A | 2/2000 | Rchards |
| 6,099,070 | A | 8/2000 | Yocum |
| 6,270,138 | B1 | 8/2001 | Laskowski et al. |
| 6,302,636 | B1 | 10/2001 | Duron |
| 6,398,478 | B2 | 6/2002 | Smith et al. |
| 6,457,764 | B1 | 10/2002 | Brannon |
| 6,499,931 | B1 | 12/2002 | Garre, Jr. et al. |
| 6,626,093 | B1 | 9/2003 | Van Der Touw et al. |
| 6,814,396 | B2 | 11/2004 | Greer et al. |
| 6,953,316 | B2 | 10/2005 | Neufeldt et al. |
| 6,974,170 | B2 | 12/2005 | Mulvihill |
| 7,293,813 | B2 | 11/2007 | Squyres et al. |
| 7,338,110 | B1 | 3/2008 | Eckloff |
| 7,641,253 | B2 | 1/2010 | Steiger et al. |
| 7,731,255 | B2 | 6/2010 | McJunkin |
| 7,823,949 | B2 | 11/2010 | Vandenheuvel et al. |
| 8,172,296 | B2 | 5/2012 | Umeda et al. |
| 8,186,917 | B2 | 5/2012 | Nelson et al. |
| 8,894,122 | B2 | 11/2014 | Gilbert et al. |
| 8,944,483 | B2 | 2/2015 | Richter |
| 9,387,788 | B1 | 7/2016 | Stroup et al. |
| D763,139 | S | 8/2016 | Giolito |
| D778,786 | S | 2/2017 | Giolito |
| 9,713,977 | B1 | 7/2017 | Neal |
| D801,909 | S | 11/2017 | Tuncel |
| 10,384,593 | B2 | 8/2019 | Altobelli |
| 11,014,483 | B2 | 5/2021 | Altobelli |
| 11,034,115 | B2 * | 6/2021 | Altobelli ............... B30B 9/3042 |
| 2003/0025017 | A1 | 2/2003 | Van Der Lely |
| 2003/0147734 | A1 | 8/2003 | Adams |
| 2003/0178868 | A1 | 9/2003 | Lapsley |
| 2008/0012372 | A1 | 1/2008 | Squyres et al. |
| 2008/0131226 | A1 | 6/2008 | Pesson |
| 2008/0142560 | A1 | 6/2008 | Lim |
| 2008/0199290 | A1 | 8/2008 | Traylor |
| 2014/0008932 | A1 | 1/2014 | Fought et al. |
| 2014/0156541 | A1 | 6/2014 | Waite et al. |
| 2017/0096294 | A1 | 4/2017 | Johnson |
| 2017/0217396 | A1 | 8/2017 | Paunov |
| 2017/0225601 | A1 | 8/2017 | Borders et al. |
| 2019/0217568 | A1 | 7/2019 | Altobelli et al. |
| 2019/0217766 | A1 | 7/2019 | Altobelli |
| 2019/0315265 | A1 | 10/2019 | Altobelli |

FOREIGN PATENT DOCUMENTS

| | | |
|---|---|---|
| CN | 104760792 | 7/2015 |
| DE | 19739603 | 3/1999 |
| DE | 102008034217 | 1/2010 |
| DE | 102012004976 | 9/2013 |
| EP | 2386504 | 11/2011 |
| EP | 2767491 | 8/2014 |
| FR | 2686326 | 7/1993 |
| GB | 856801 | 12/1960 |
| GB | 2263093 | 7/1993 |
| GB | 2468351 | 9/2010 |
| KR | 20100018824 | 2/2010 |
| WO | 9301111 | 1/1993 |
| WO | 2009062482 | 5/2009 |
| WO | 2010136167 | 12/2010 |

OTHER PUBLICATIONS

Altobelli, Michael; Certificate of Correction for U.S. Appl. No. 16/453,304, filed Jun. 26, 2019, mailed Jul. 20, 2021, 1 pg.

Altobelli, Michael; Corrected Notice of Allowance for U.S. Appl. No. 16/453,304, filed Jun. 26, 2019, dated Apr. 27, 2021, 8 pgs.

Altobelli, Michael; Non-Final Office Action for U.S. Appl. No. 16/453,304, filed Jun. 26, 2019, dated Dec. 4, 2020, 32 pgs.

Altobelli, Michael; Notice of Allowance for U.S. Appl. No. 16/453,304, filed Jun. 26, 2019, dated Mar. 12, 2021, 11 pgs.

Altobelli, Michael; Corrected Notice of Allowance for U.S. Appl. No. 15/869,575, filed Jan. 12, 2018, dated Mar. 8, 2021, 6 pgs.

Altobelli, Michael; Corrected Notice of Allowance for U.S. Appl. No. 15/869,575, filed Jan. 12, 2018, dated May 13, 2021, 6 pgs.

Altobelli, Michael; Final Office Action for U.S. Appl. No. 15/869,575, filed Jan. 12, 2018, dated Jul. 16, 2020, 18 pgs.

Altobelli, Michael; Non-Final Office Action for U.S. Appl. No. 15/869,575, filed Jan. 12, 2018, dated Oct. 23, 2020, 17 pgs.

Altobelli, Michael; Non-Final Office Action for U.S. Appl. No. 15/869,575, filed Jan. 12, 2018, dated Feb. 5, 2020, 35 pgs.

Altobelli, Michael; Notice of Allowance for U.S. Appl. No. 15/869,575, filed Jan. 12, 2018, dated Feb. 11, 2021, 11 pgs.

OCR V50: Vimeo Video, Jul. 26, 2017, https://vimeo.com/227171677 (Year: 2017).

Cardboard Balers; Article entitled: "Trailer Cardboard Baler—The Perfect Portable Waste Management Solution", publicly available prior to Jan. 12, 2018, 3 pgs.

Encore Systems; Article entitled: "Encore Packer model EP100P portable waste tire baler", located at <http://www.tirebaler.com/balers.html>, copyright 2016, 2 pgs.

QCR Recycling Equipment; Article entitled: "Cardboard Recycling Balers and Compactors", publicly available prior to Jan. 12, 2018, located at <https://www.qcr.co.uk/balers-compactors/cardboard-baler>, 2 pgs.

Ranger Design, Inc.; Article entitled: "Ford Transit Gallery", located at <https://rangerdesign.com/vehicles/ford-transit/transit-gallery/>, accessed on Nov. 9, 2017, 5 pgs.

Utility Trailer; Article entitled: "3000R Multi Temp", located at <https://www.utilitytrailer.com/trailer/3000r-multi-temp/>, accessed on Nov. 15, 2017, 3 pgs.

\* cited by examiner

DELIVERY AND COLLECTION VEHICLE WITH BALER

CROSS-REFERENCE TO RELATED APPLICATIONS

This application is a continuation application of U.S. patent application Ser. No. 15/869,575, filed Jan. 12, 2018, which is incorporated by reference herein in its entirety.

TECHNICAL FIELD

This disclosure relates to vehicles. More specifically, this disclosure relates to vehicle modifications.

BACKGROUND

As market share of consumer purchases in electronic commerce (hereinafter "e-commerce") continually increases, associated numbers of home deliveries have increased, and the usage of packaging—particularly corrugated cardboard and associated packaging products—also has continued to rise. As consumers encounter used packaging—termed "old corrugated cardboard" or "OCC"—a growing concern is the disposal of said OCC. Many municipalities have yet to provide municipal recycling services, and those that do have municipal recycling services may recycle OCC in less-than-ideal methods. Consumers often place importance on sustainability, and many consumers will consider the environmental impact of the packaging they use in deciding whether to engage in e-commerce. Simply put, if packaging is not recyclable, many consumers will choose alternative methods of engaging in commerce to avoid mass disposal of packaging. Additionally, OCC can have a commercial value in that the recyclability of OCC can be monetized.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A vehicle can include a front end, a rear end, a driver's side, and a passenger's side, the vehicle defining a cargo compartment between the front end and the rear end; and a baler mounted on the vehicle, the baler comprising a compression system and a baling system. The vehicle can further include an extension connected to the vehicle proximate the rear end, the extension comprising a first side opposing a second side and a ceiling opposing a bottom, each of the first side and second side connected to the ceiling and the bottom; and a partition arranged between the first side and the second side, wherein the ceiling, the first side, the bottom, and the partition define a storage compartment, and wherein the ceiling, the second side, the bottom, and the partition define a baler compartment, wherein the baler is arranged within the baler compartment.

An extension for connection to a vehicle can include a first side, a second side, a ceiling, and a bottom, the first side opposing the second side and the ceiling opposing the bottom, each of the first side and second side connected to the ceiling and the bottom; a partition arranged between the first side and the second side; and a baler, wherein the ceiling, the first side, the bottom, and the partition define a storage compartment, wherein the ceiling, the second side, the bottom, and the partition define a baler compartment, and wherein a baler is arranged within the baler compartment, the baler comprising a compression system and a baling system.

A method of using a vehicle can include obtaining a vehicle, the vehicle including a front end, a rear end, a driver's side, and a passenger's side, the vehicle defining a cargo compartment between the front end and the rear end, and a baler mounted on the vehicle, the baler defining a chamber, the baler comprising a compression system comprising a shaft connected to a compression plate, a baling system, a sleeve connected to a top of the baler, a chamber door hingedly attached to a front of the baler, a baler door hingedly attached to the front of the baler, wherein each of the chamber door and the baler door are arranged to cover the chamber, wherein the shaft is arranged at least partially within the sleeve, and wherein the compression plate is arranged within the chamber; placing recovered materials within the chamber; and compressing the recovered materials.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
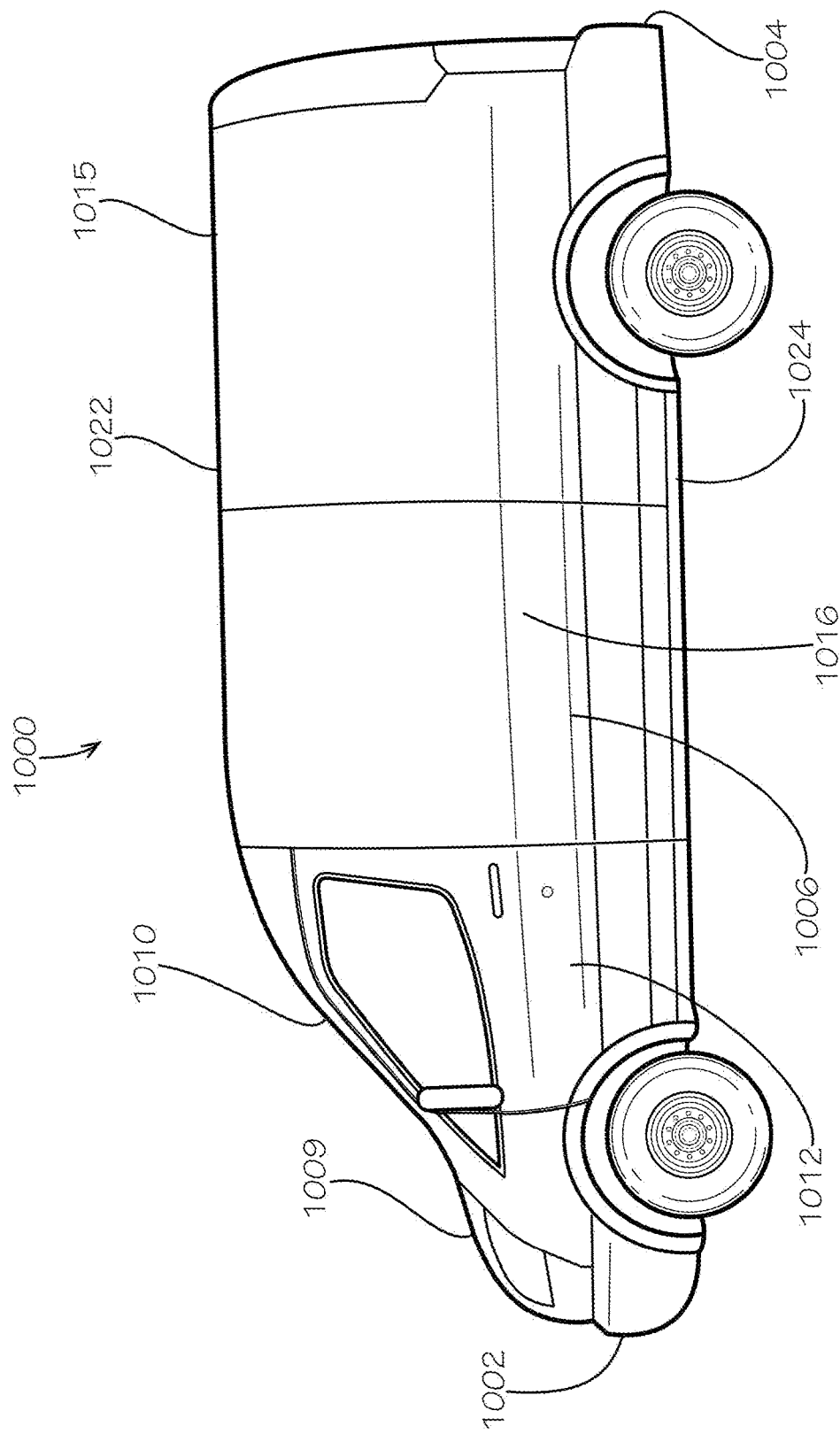
FIG. 1A is a side view of a vehicle in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a vehicle and associated methods, systems, devices, and various apparatus. The vehicle can be a delivery vehicle and can include an apparatus for receiving and collecting recyclables. It would be understood by one of skill in the art that the disclosed vehicle is described in but a few exemplary embodiments among many. No particular terminology or description should be considered limiting on the disclosure or the scope of any claims issuing therefrom.

Figure 1B:
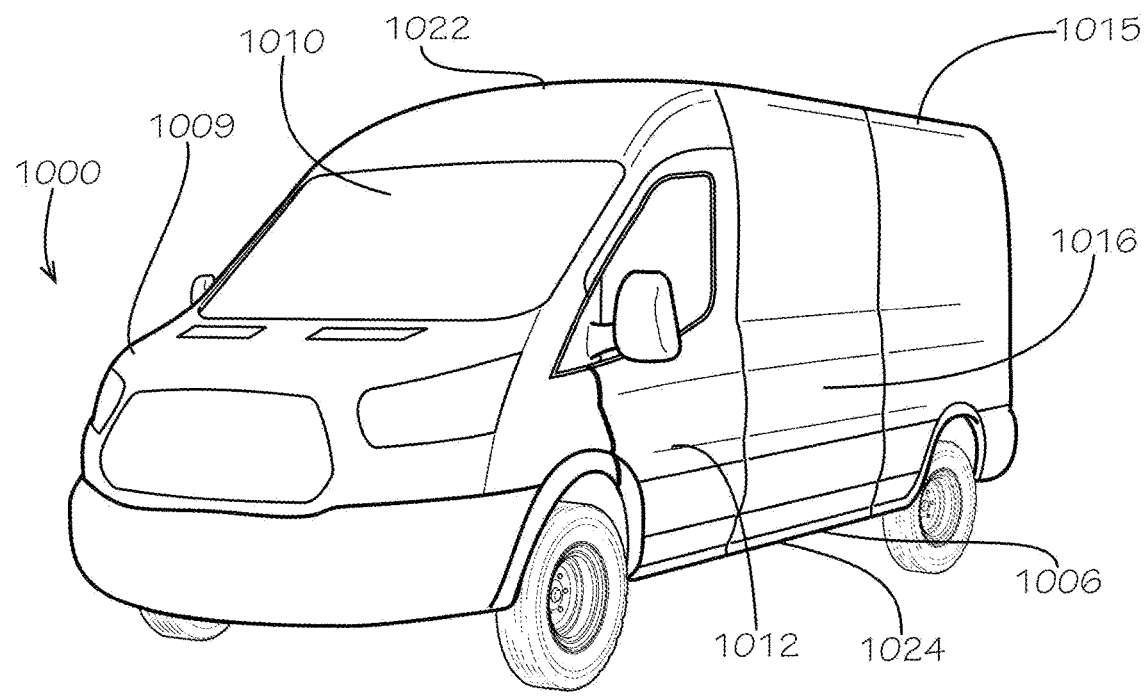
FIG. 1B is a front perspective view of the vehicle of FIG. 1A.
Figure 1C:
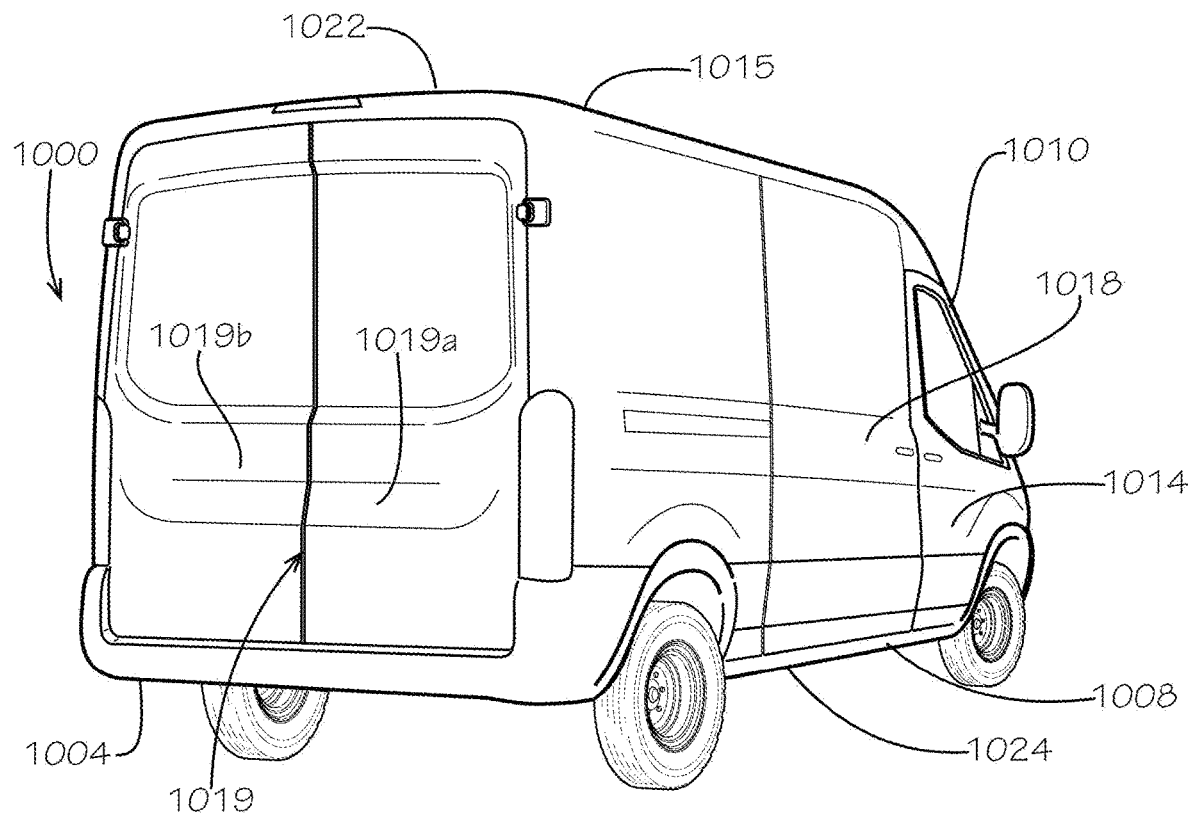
FIG. 1C is a rear perspective view of the vehicle of FIG. 1A.

One embodiment of a vehicle 1000 is disclosed and described with reference to FIGS. 1A-1C. The vehicle 1000 can comprise a front end 1002, a rear end 1004, a driver's side 1006, and a passenger's side 1008. The vehicle 1000 can comprise an engine portion 1009, a passenger compartment 1010 and a cargo compartment 1015. The cargo compartment 1015 can include at least one shelf for holding packages to be delivered to customers; the cargo compartment 1015 can include a plurality of shelves for holding packages to be delivered to customers. The vehicle 1000 can comprise a driver's side passenger door 1012 and a passenger's side passenger door 1014 that can provide access to the passenger compartment 1010. Similarly, the vehicle 1000 can comprise a driver's side cargo door 1016 and a passenger's side cargo door 1018 that can provide access to the cargo compartment 1015. In various aspects, the various doors 1012,1014,1016,1018 can be traditional swinging doors, sliding doors, gullwing doors, or a variety of other types of doors known in the art. The vehicle 1000 can include a ceiling 1022 and a bottom 1024. Various base vehicles can be used to form vehicle 1000 and would be understood by one of skill in the art. One suitable base vehicle is the Ford F150 Transit Full-Size Cargo Van. Additional suitable base vehicles include the Ford Econoline Cargo Van, the Chevrolet Express Cargo Van, and the Dodge RAM ProMaster Cargo Van, among others. One of skill in the art would understand that the systems and apparatus disclosed within would be useful or applicable to a variety of vehicles, and no single vehicle or vehicular modification should be considered limiting on the scope of the disclosure. In the current aspect, the vehicle 1000 of FIGS. 1A-1C can serve as a base vehicle. One of skill in the art would understand standard setup for various delivery vans and would understand that the vehicle 1000 would not deviate substantially from what would be expected in the art.

Figure 2:
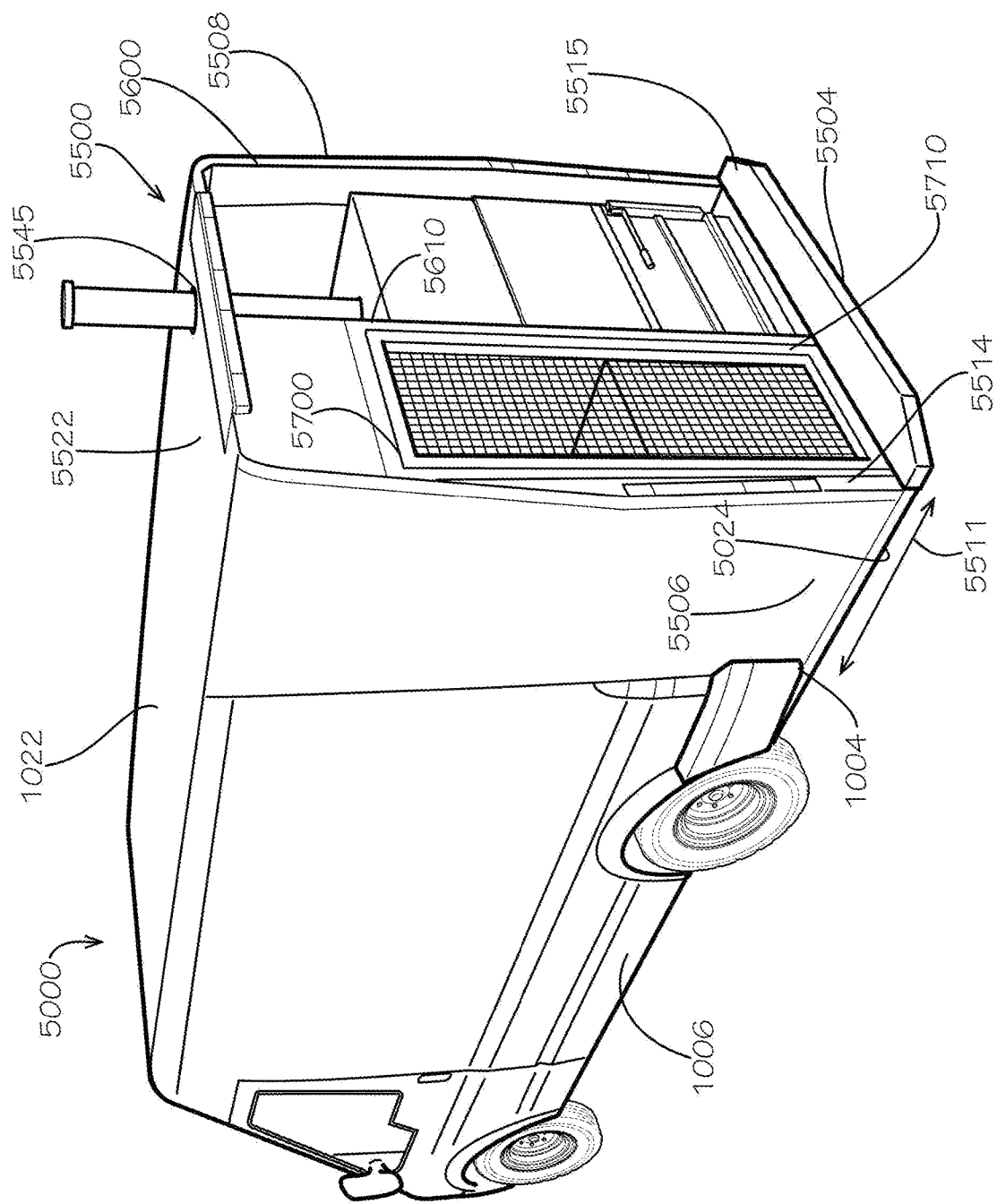
FIG. 2 is a rear perspective view of a vehicle in accord with one aspect of the current disclosure.

A vehicle 5000 is disclosed and described with reference to FIG. 2. The vehicle 5000 can include the base physical parameters of vehicle 1000, and one of skill in the art would understand that similarly drawn or referenced features of the two vehicles 1000,5000 can be of similar physical character.

The vehicle 5000 can include an extension 5500 connected to the rear end 1004. In various aspects and as shown, the extension 5500 can be mounted on the vehicle 5000 at the rear end 1004. The extension 5500 can comprise a full, lightweight enclosure built along with or connected to a portion of the vehicle 1000 to form vehicle 5000. The extension 5500 can be integral with the remaining elements of the vehicle 5000 in various aspects. The extension 5500 can be a post-construction modification on various aspects. In the current aspect, the extension 5500 can be a reinforced compartment connected to a frame of the vehicle 5000. Connection to the frame of the vehicle 5000 can comprise attachment to an extended platform integrally connected to the frame. The extension 5500 can be securely attached to the vehicle 5000 using bolting, harnesses, welding, or other mechanical fastening elements. In various aspects, the extension 5500 can be removably attached to the vehicle 5000.

In the current aspect, the extension 5500 can include a driver's side 5506 coincident with the driver's side 1006, a passenger's side 5508 coincident with the passenger's side 1008, a ceiling 5522 coincident with the ceiling 1022, and a bottom 5024 coincident with bottom 1024. In the current aspect, the profile of the extension 5500 can generally match the profile of the vehicle 5000. The extension 5500 can extend behind the rear end 1004 a linear extent 5511 that can terminate at an extension wall end 5514. The extension 5500 can comprise a step 5515 that can define an extension rear end 5504 of the vehicle 5000.

The extension 5500 can define a plurality of compartments. In the current aspect, the extension 5500 can define a baler compartment 5600 on one side of the extension 5500. A partition 5610 can partially define the baler compartment 5600. The extension 5500 can define a storage compartment 5700. In the current aspect, the partition 5610 can partially define the storage compartment 5700. In the current aspect, the partition 5610 can be arranged between the baler compartment 5600 and the storage compartment 5700 to define a wall between the two compartments. A storage compartment door 5710 can be removably attached to the extension 5500 in alignment with the storage compartment 5700 to provide an enclosure of the storage compartment 5700. As can be seen, the ceiling 5522 can define an aperture 5545 as will be discussed in further detail below.

Figure 3B:
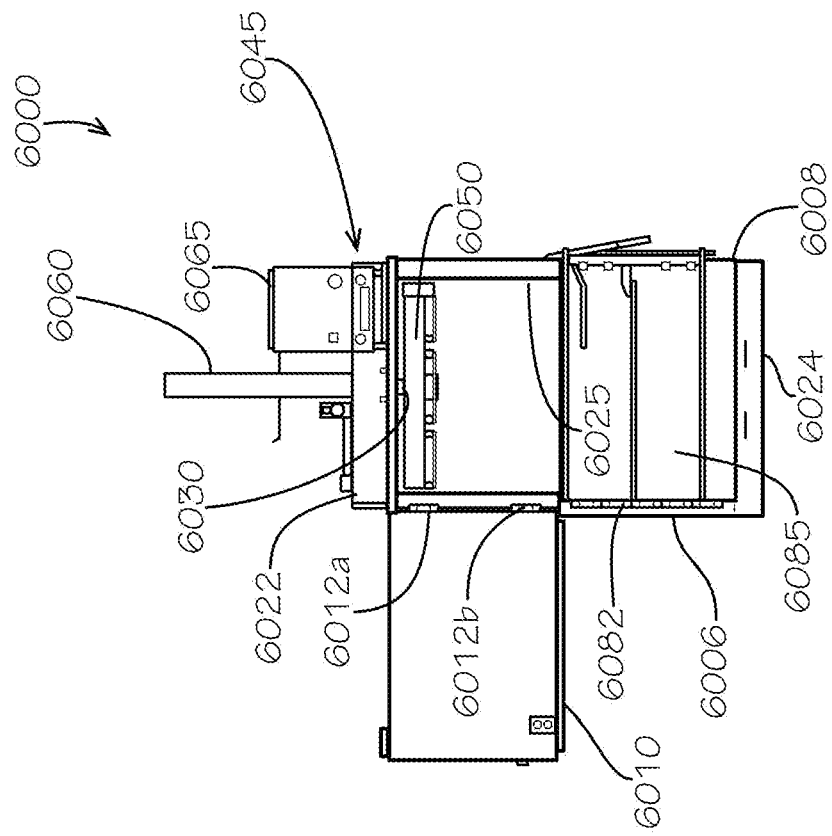
FIG. 3B is a front view of the baler of FIG. 3A.
Figure 3A:
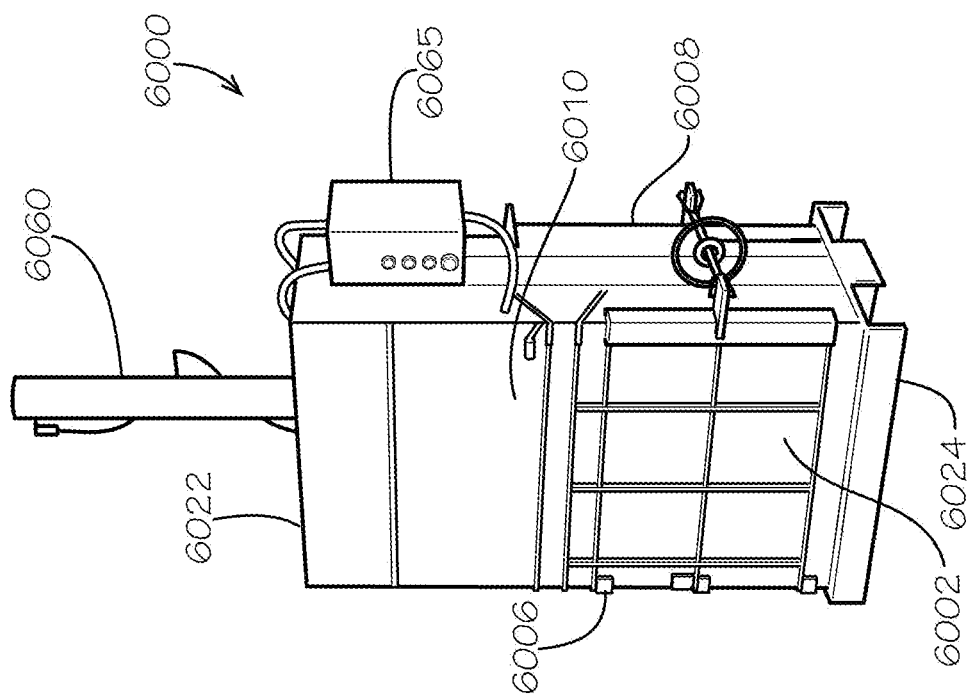
FIG. 3A is a front perspective view of a baler of the vehicle of FIG. 2 in accord with one aspect of the current disclosure.

A baler 6000 can be seen with reference to FIGS. 3A-3B. In the current aspect, the baler 6000 can be an industrially-available vertical mini-baler such as the M30STD Vertical Baler from Harmony Enterprises, Inc, 704 Main Avenue North, Harmony Minn. 55939. The baler 6000 can be an M-30 STD Mini-Baler/Vertical Baler or an M-30 HD High Density Mini-Baler/Vertical Baler, both from Ver-Tec, Rockford, Minn. 55373. One of skill in the art would understand that the exemplary balers are but a few options of many possible options, and specific choices provided should not be considered limiting on the scope of the disclosure. The baler 6000 can be a hydraulic baler including hydraulic compression actuation. In various aspects, various balers can be utilized in place of baler 6000. By way of non-limiting example, in various aspects, a horizontal baler can be utilized. In various aspects, custom-built horizontal balers can be utilized. In various aspects, commercially-available horizontal balers can be utilized. In various aspects, some larger commercially-available horizontal balers can fit more easily in larger versions of the vehicle 5000.

The baler 6000 can comprise a front 6002, a top 6022, a bottom 6024, a first side 6006, a second side 6008, and a back (not pictured). The baler 6000 can comprise a chamber door 6010 hingedly connected to the front 6002 of the baler 6000 along hinges 6012a,b. The baler 6000 can define a chamber 6025 located behind the chamber door 6010 when the chamber door 6010 is in a closed position. The chamber 6025 can provide a collection area for recovered materials to be collected and compressed before being tied into bales (discussed in further detail below). The baler 6000 can comprise a compression system 6045, and the compression system 6045 can comprise a compression plate 6050 arranged within the chamber 6025 and attached to a compression shaft 6030. The compression shaft 6030 can extend through the top 6022 of the baler 6000. A sleeve 6060 can be attached to the top 6022 of the baler 6000 and can provide a cover for the shaft 6030. A control box 6065 can be seen attached to the baler 6000. The location of the control box 6065 is not material to the scope of the disclosure, and the control box 6065 can be connected to or attached to various other portions of the vehicle 5000 in various aspects. The baler 6000 can also comprise a baler door 6085 hingedly connected to the front 6002 of the baler 6000 along hinges 6082.

In operation the vehicle 5000 can be utilized as a combination delivery and collection vehicle. Central portions of the vehicle 5000 can be utilized as normal for normal delivery purposes—storing packages in the cargo compartment 1015 for delivery to consumers of e-commerce. However, the extension 5500 can provide for collection of various recovered materials 5035, specifically including OCC. In various aspects, the vehicle 5000 can be utilized to retrieve additional materials for recycling, including other types of paper packaging (padded envelopes, mailing tubes, shredding byproducts, paper grocery bags, and non-corrugated cardboard, among others), plastic wrap, shrink film, Styrofoam, and plastic containers, among others. One of skill in the art would understand that the inclusion of OCC is intended to be exemplary and non-limiting on the scope of the current disclosure.

Figure 4:
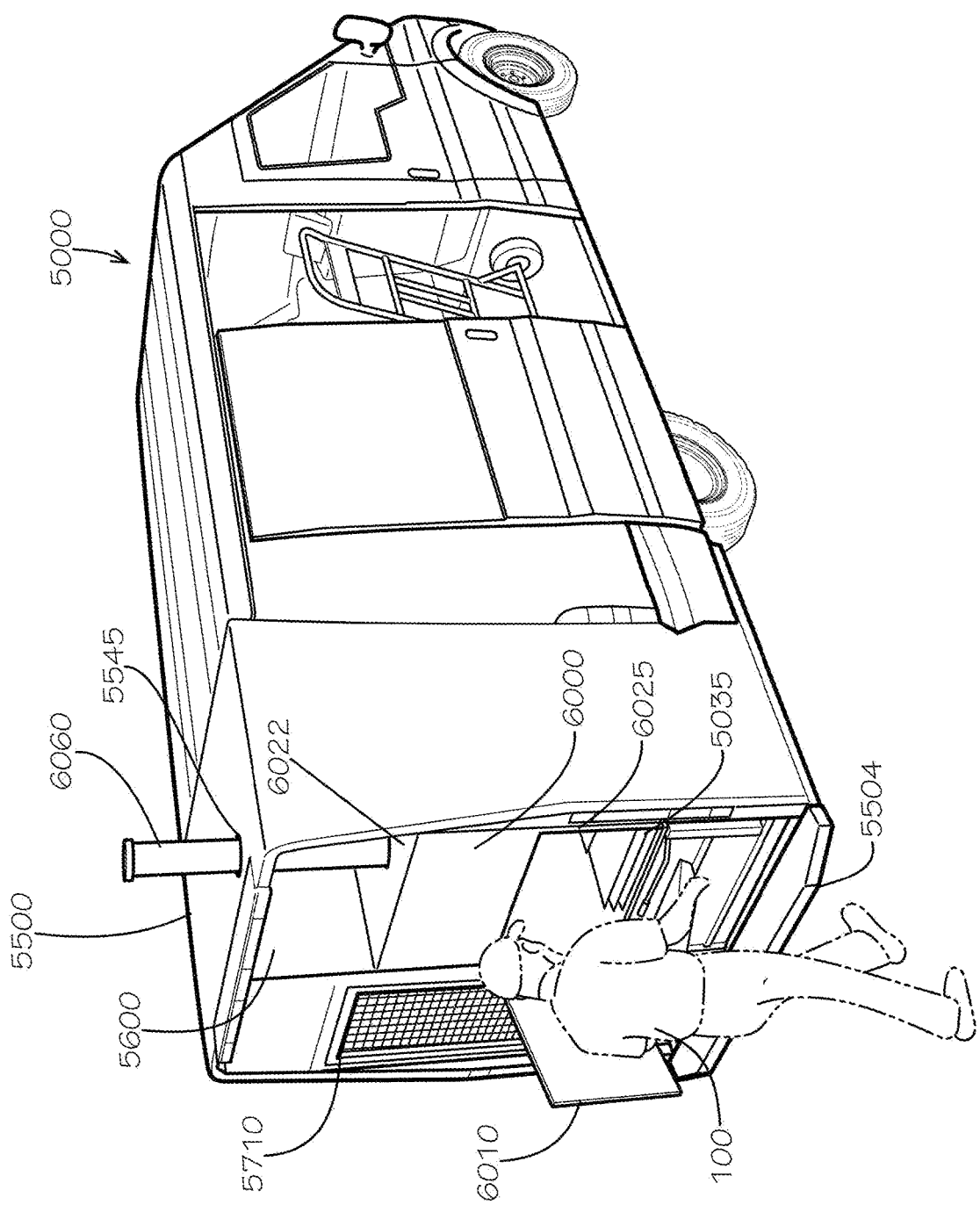
FIG. 4 is an alternative rear perspective view of the vehicle of FIG. 2 in operation in accord with one aspect of the current disclosure.

With reference to FIG. 4, the vehicle 5000 can be seen including the baler 6000. The baler compartment 5600 can be sized to accept the baler 6000 such that the various features of the baler 6000 fit snugly within the baler compartment 5600. In various aspects, the baler 6000 can be secured to the vehicle 5000 using mechanical fasteners such as those previously mentioned or known in the art. The sleeve 6060 can be seen extended through the aperture 5545. As deliveries are made by a worker 100, the worker 100 can manually collect OCC as placed for collection by consumers. The collected OCC can be included in recovered materials 5035. Recovered materials 5035 can be placed within the chamber 6025 for storage. The chamber door 6010 can be closed during travel to ensure recovered materials 5035 do not fall out of the baler 6000. As the volume of recovered materials 5035 grows within the chamber 6025, the worker 100 can actuate the hydraulic compression functions of the baler 6000 to reduce the volume. The compression plate 6050 can compress the OCC and recovered materials 5035 to reduce volume occupied by the recovered materials 5035 within the vehicle 5000. As the amount of recovered materials 5035 can continue to increase, the chamber 6025 can continue to fill, and the worker 100 can continue to compress the recovered materials 5035 within the baler 6000.

Figure 5:
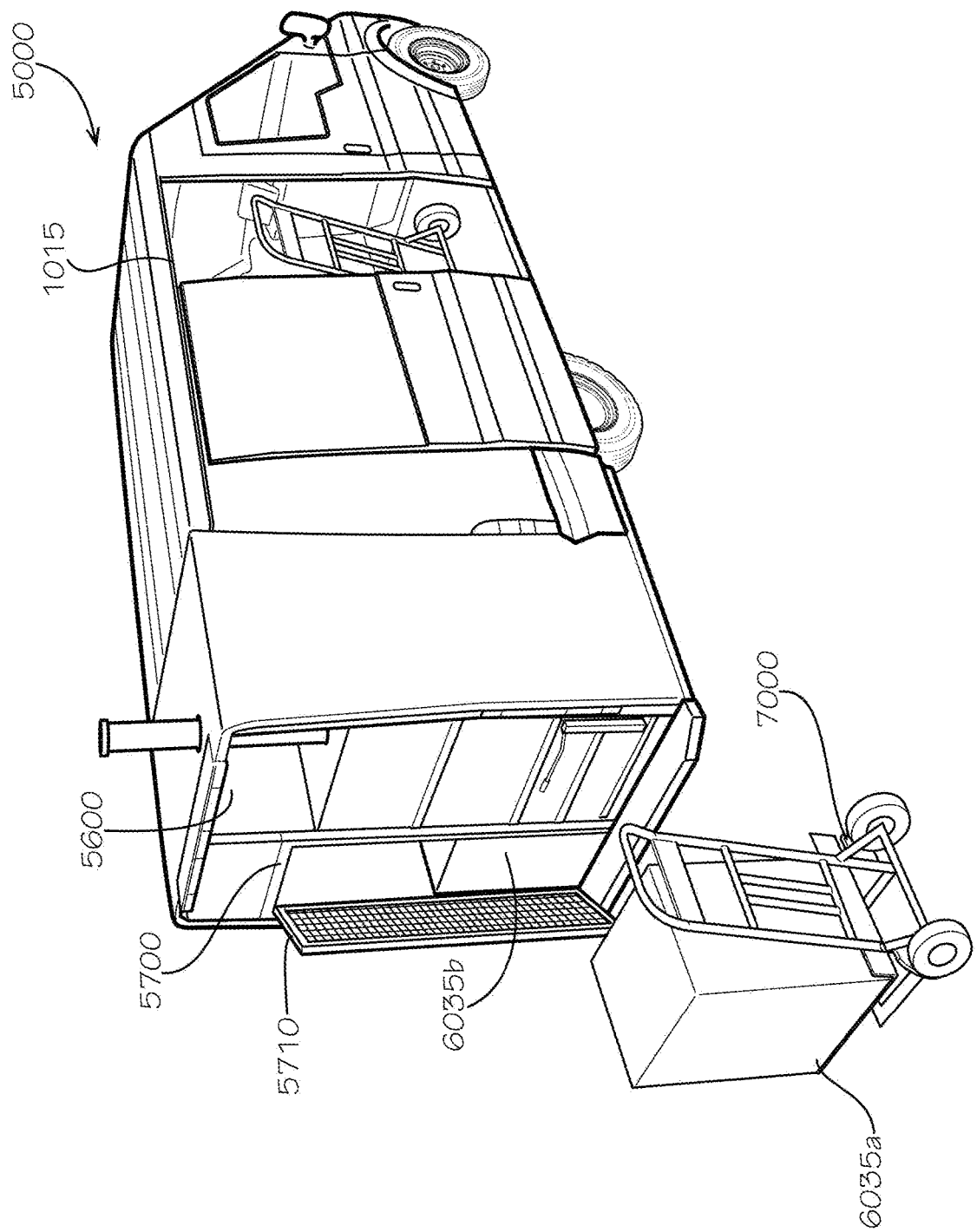
FIG. 5 is the alternative rear perspective view of the vehicle of FIG. 4 including a cart in accord with one aspect of the current disclosure.

Once the chamber 6025 becomes full, the worker 100 can utilize a baling system of the baler 6000 to band the recovered materials 5035 into a bale 6035 (shown as 6035a, b) as seen with reference to FIG. 5. Convention and usage of the baling system would be understood by one of skill in the art. The bale 6035 can be tied off using a variety of baling wire options, including but not limited to black annealed baling wire, single loop baling wire, galvanized baling wire, painted baling wire, double loop baling wire, square lock baling wire, box or boxed baling wire, coiled baling wire, stem baling wire, stump baling wire, or high tensile baling wire.

In practice, the bale 6035 can be ejected from the baler 6000 by opening the baler door 6085 and following a mechanical process that can both roll the compressed bale 6035 of recovered materials 5035 out of the baler 6000 while simultaneously tying baling wire around the bale 6035.

In various aspects, the bales 6035 can be heavy—in excess of 200 lbs. As such, it can be of advantage to include a cart 7000 for handling the bales 6035. In various aspects, the cart 7000 can be various implementations. In various aspects, the cart 7000 can be a steel frame hydraulic pedalift. One example of a suitable pedalift can include the Wesco 260002 Steel Frame 2-Wheeled Hydraulic Pedalift, available from Westco Industrial Products, Inc., 1250 Welsh Road, North Wales, Pa. 19454. One of skill in the art would understand that the exemplary pedalift or cart is but one option of many possible options, and specific choices provided should not be considered limiting on the scope of the disclosure. The cart 7000 can assist in handling the bales 6035 by easily lifting and lowering the bales 6035 as necessary. If the bale 6035 is ejected from the baler 6000, the cart 7000 can be arranged to accept—and thereafter can be used to transport—the bale 6035.

As can be seen from continuing reference to FIG. 5, bales 6035*a,b* can be stored within the storage compartment 5700. The storage compartment door 5710 can be hingedly opened to allow access to the storage compartment 5700. The storage compartment 5700 can be sized to accept bales 6035 as formed from the baler 6000. Bales 6035 as handled by the cart 7000 can be deposited within the storage compartment 5700, and the storage compartment door 5710 can then be secured in a closed position. In the current aspect, the storage compartment door 5710 can be gated or meshed to allow simple visual inspection of the contents within the storage compartment 5700, although various aspects can include various features for the storage compartment door 5710.

When the storage compartment 5700 is full, the vehicle 5000 can be taken to a facility for removal of the bales 6035. In various applications, the recovered materials 5035 making up the bales 6035 can be recycled, including being used to produce new corrugated cardboard.

In various aspects where larger vehicles were utilized, balers such as baler 6000 can be placed within the vehicle without need for added extensions such as extension 5500.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A vehicle assembly comprising:
   a vehicle, the vehicle comprising
      a front end, a rear end, a driver's side, and a passenger's side, the vehicle defining a passenger compartment and a cargo compartment between the front end and the rear end, the passenger compartment being located proximate a front end of the vehicle and the cargo compartment being located rearward of the passenger compartment, the cargo compartment being accessible by a cargo door and the passenger compartment being accessible by a passenger door; and
   an extension connected to the rear end, the extension comprising
      a first side opposing a second side and a ceiling opposing a bottom, each of the first side and second side connected to the ceiling and the bottom, the first side being arranged about coincident with the driver's side the second side being arranged about coincident with the passenger's side; and
      a partition arranged between the first side and the second side and attached to the ceiling and the bottom,
   wherein the ceiling, the first side, the bottom, and the partition define a storage compartment, and
   wherein the ceiling, the second side, the bottom, and the partition define a baler compartment.

2. The vehicle assembly of claim 1, wherein a baler is arranged within the baler compartment.

3. The vehicle assembly of claim 2, wherein the baler comprises a sleeve connected to a top of the baler, wherein the sleeve is arranged within an aperture defined in the ceiling of the extension.

4. The vehicle assembly of claim 3, wherein a storage compartment door is connected to the extension, the storage compartment door arranged to engage the storage compartment.

5. The vehicle assembly of claim 4, wherein the storage compartment door is meshed.

6. The vehicle assembly of claim 3, wherein the baler defines a chamber and wherein the baler further comprises a chamber door hingedly attached to a front of the baler and a baler door hingedly attached to the front of the baler, each of the chamber door and the baler door covering the chamber.

7. The vehicle assembly of claim 6, wherein the compression system comprises a shaft connected to a compression plate, wherein the shaft is arranged at least partially within the sleeve, and wherein the compression plate is arranged within the chamber.

8. An extension for connection to a vehicle having a driver's side and a passenger's side, the extension comprising:
a first side, a second side, a ceiling, and a bottom, the first side opposing the second side and the ceiling opposing the bottom, each of the first side and second side connected to the ceiling and the bottom;
a partition arranged between the first side and the second side; and
a baler,
wherein the ceiling, the first side, the bottom, and the partition define a storage compartment,
wherein the ceiling, the second side, the bottom, and the partition define a baler compartment, wherein the baler compartment and the storage compartment are thereby side-by-side and accessible from the same opening of the extension,
wherein a distance between the first side and the second side is about the same as a distance between the driver's side and the passenger's side, and
wherein the baler is arranged within the baler compartment, the baler comprising a compression system and a baling system.

9. The extension of claim 8, wherein the baler comprises a sleeve connected to a top of the baler, and wherein the sleeve is arranged within an aperture defined in the ceiling of the extension.

10. The extension of claim 9, wherein a storage compartment door is connected to the extension, the storage compartment door arranged to engage the storage compartment.

11. The extension of claim 9, wherein the baler defines a chamber and wherein the baler further comprises a chamber door and a baler door each hingedly attached to a front of the baler, each of the chamber door and the baler door covering the chamber.

12. The extension of claim 11, wherein:
the compression system comprises a shaft connected to a compression plate;
the shaft is arranged at least partially within the sleeve; and
the compression plate is arranged within the chamber.

13. A method of using a vehicle, the method comprising:
obtaining a vehicle, the vehicle comprising:
a front end, a rear end, a driver's side, and a passenger's side, the vehicle defining a passenger compartment and a cargo compartment between the front end and the rear end, the passenger compartment being located proximate a front end of the vehicle and the cargo compartment being located rearward of the passenger compartment, the cargo compartment being accessible by a cargo door and the passenger compartment being accessible by a passenger door;
an extension connected to the rear end, the extension comprising
a first side opposing a second side and a ceiling opposing a bottom, each of the first side and second side connected to the ceiling and the bottom, the first side being arranged about coincident with the driver's side the second side being arranged about coincident with the passenger's side; and
a partition arranged between the first side and the second side and attached to the ceiling and the bottom,
wherein the ceiling, the first side, the bottom, and the partition define a storage compartment, and
wherein the ceiling, the second side, the bottom, and the partition define a baler compartment;
a baler mounted on the extension, the baler comprising
a compression system comprising a shaft connected to a compression plate,
a baling system,
a sleeve connected to a top of the baler,
a chamber door hingedly attached to a front of the baler, and
a baler door hingedly attached to the front of the baler,
wherein each of the chamber door and the baler door are arranged to cover the chamber,
wherein the shaft is arranged at least partially within the sleeve, and
wherein the compression plate is arranged within the chamber;
placing recovered materials within the chamber; and
compressing the recovered materials.

14. The method of claim 13, wherein the step of placing recovered materials within the chamber further comprises the steps of
opening the chamber door,
inserting the recovered materials into the chamber, and
closing the chamber door,
wherein the step of compressing the recovered materials comprises actuating the compression system.

15. The method of claim 13, further comprising a step of baling the recovered materials into at least one bale.

16. The method of claim 15, further comprising a step of depositing each bale into the storage compartment.

17. The method of claim 15, wherein the step of baling the recovered materials further comprises the steps of
at least partially wrapping each bale with baling wire,
opening the baler door, and
ejecting the bale.

18. The method of claim 17, wherein the cargo compartment contains at least one package to be delivered, further comprising the step of delivering each package to be delivered.

19. The method of claim 17, further comprising a step of removing each bale from the vehicle for recycling.

20. The method of claim 19, wherein the cargo compartment contains at least one package to be delivered, further comprising the step of delivering each package to be delivered.

* * * * *

UNITED STATES PATENT AND TRADEMARK OFFICE
CERTIFICATE OF CORRECTION

PATENT NO. : 11,607,857 B2
APPLICATION NO. : 17/315018
DATED : March 21, 2023
INVENTOR(S) : Michael Altobelli and Myles Cohen It is certified that error appears in the above-identified patent and that said Letters Patent is hereby corrected as shown below:

In the Claims

Column 8, Line 27:
Please replace the term "a front end" with the term --the front end--.

Column 8, Lines 38-39:
Please replace the term "the driver's side the second side" with the term --the driver's side, and the second side--.

Column 8, Lines 66-77:
Please replace the term "the compression system" with the term --a compression system--.

Column 9, Line 19:
Please replace the term "the same opening" with the term --a same opening--.

Column 9, Line 46:
Please replace the term "obtaining a vehicle" with the term --obtaining the vehicle--.

Column 9, Line 51:
Please replace the term "a front end" with the term --the front end--.

Column 10, Line 23:
Please replace the term "the chamber" with the term --a chamber--.

Signed and Sealed this
Twenty-third Day of May, 2023

Katherine Kelly Vidal
*Director of the United States Patent and Trademark Office*